United States Patent
Murai et al.

(10) Patent No.: US 8,040,562 B2
(45) Date of Patent: Oct. 18, 2011

(54) IMAGE PROCESSING APPARATUS, IMAGE PROCESSING METHOD, AND COMPUTER-READABLE ENCODING MEDIUM ENCODED WITH A COMPUTER PROGRAM

(75) Inventors: Hironobu Murai, Tokyo (JP);
Masakazu Yoshida, Kanagawa (JP);
Takashi Kimura, Kanagawa (JP);
Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 505 days.

(21) Appl. No.: 12/276,890

(22) Filed: Nov. 24, 2008

(65) Prior Publication Data
US 2009/0147327 A1 Jun. 11, 2009

(30) Foreign Application Priority Data
Dec. 5, 2007 (JP) ................. 2007-314705

(51) Int. Cl.
*G03F 3/08* (2006.01)

(52) U.S. Cl. ....... 358/1.9; 358/3.13; 358/3.26; 358/518; 358/521; 358/525

(58) Field of Classification Search .............. 358/1.2, 358/1.9, 3.13, 3.26, 518, 521, 523, 524, 525
See application file for complete search history.

(56) References Cited

U.S. PATENT DOCUMENTS

| | | | |
|---|---|---|---|
| 5,075,767 A | 12/1991 | Takaragi | |
| 5,585,833 A * | 12/1996 | Matumoto | 347/183 |
| 6,134,025 A * | 10/2000 | Takeuchi et al. | 358/1.2 |
| 6,243,174 B1 * | 6/2001 | Fukasawa | 358/518 |
| 6,415,065 B1 * | 7/2002 | Miyake | 382/300 |
| 6,700,559 B1 | 3/2004 | Tanaka et al. | |
| 7,327,495 B2 * | 2/2008 | Kawamoto et al. | 358/3.07 |
| 7,502,150 B2 * | 3/2009 | Gotoh et al. | 358/525 |
| 2002/0196470 A1 * | 12/2002 | Kawamoto et al. | 358/3.06 |
| 2004/0223173 A1 | 11/2004 | Arai | |
| 2005/0264836 A1 * | 12/2005 | Gotoh et al. | 358/1.9 |
| 2006/0132874 A1 | 6/2006 | Ishikawa | |
| 2006/0181562 A1 | 8/2006 | Hirano et al. | |
| 2007/0041065 A1 * | 2/2007 | Kubo et al. | 358/521 |

FOREIGN PATENT DOCUMENTS

| | | |
|---|---|---|
| JP | 6-334850 | 12/1994 |
| JP | 9-326931 | 12/1997 |

* cited by examiner

*Primary Examiner* — Kimberly A Williams
(74) *Attorney, Agent, or Firm* — Oblon, Spivak, McClelland, Maier & Neustadt, L.L.P.

(57) ABSTRACT

An image processing apparatus, including a color conversion part configured to conduct a color conversion of image data. The color conversion part extends an information amount of an output value in the color conversion based on a first minimum information amount possible to depict a gradation in a lattice point interval of an input value in a look up table used for the color conversion.

9 Claims, 12 Drawing Sheets

FIG.8

124 COLOR CONVERSION TABLE

LATTICE POINT (8bits)

| R | G | B |
|---|---|---|
| 0 | 0 | 0 |
| 0 | 0 | 16 |
| 0 | 0 | 32 |

LATTICE POINT VALUE (8bits)

| C | M | Y | K |
|---|---|---|---|
| 64 | 64 | 64 | 32 |
| 80 | 80 | 96 | 28 |
| 96 | 96 | 128 | 24 |

FIG.11

| INPUT VALUE (12bits) | OUTPUT VALUE (14bits) | OUTPUT VALUE (12bits) | LOGICAL VALUE |
|---|---|---|---|
| 0 | 0 | 0 | 0 |
| 1 | 0.25 | 0 | 0.26082043 |
| 2 | 0.5 | 0 | 0.52175305 |
| 3 | 0.75 | 0 | 0.78291004 |
| 4 | 1 | 1 | 1.04440353 |
| 5 | 1.25 | 1 | 1.30634563 |
| 6 | 1.5 | 1 | 1.56884835 |
| 7 | 1.75 | 1 | 1.83202363 |
| 8 | 2 | 2 | 2.0959833 |
| 9 | 2.25 | 2 | 2.36083909 |
| 10 | 2.5 | 2 | 2.62670256 |
| 11 | 2.75 | 2 | 2.89368515 |
| 12 | 3 | 3 | 3.16189812 |
| 13 | 3.25 | 3 | 3.43145253 |
| 14 | 3.5 | 3 | 3.70245925 |
| 15 | 3.75 | 3 | 3.97502893 |
| 16 | 4 | 4 | 4.24927198 |
| 17 | 4.5 | 4 | 4.52529855 |
| 18 | 4.75 | 4 | 4.80321853 |

125

IMAGE PROCESSING APPARATUS, IMAGE PROCESSING METHOD, AND COMPUTER-READABLE ENCODING MEDIUM ENCODED WITH A COMPUTER PROGRAM

BACKGROUND OF THE INVENTION

1. Field of the Invention

The present invention generally relates to an image processing apparatus, an image processing method, and a computer-readable encoding medium encoded with a computer program, and more particularly to the image processing apparatus, the image processing method, and the computer-readable encoding medium encoded with a computer program, in which a color conversion or a density correction is conducted.

2. Description of the Related Art

FIG. 1 is a block diagram illustrating an example of image processes conducted by a printer driver, a controller of a printer, or a like. FIG. 1 illustrates that the image processes including a color conversion, a γ-correction, a halftoning process are conducted with respect to image data in which each gradation of an RGB (Red, Green, and Blue) is 8 bits for each pixel.

In the color conversion, a color space in which the image data are input is converted into another color space of a CMYK (Cyan, Magenta, Yellow, and Black) for an ink color. As a result, the image data in which each gradation of the CMYK is 8 bits for each pixel are output. In the γ-correction, a density correction is conducted, and the image data in which each gradation of the CMYK is 8 bits are output. In the halftoning process, a pseudo-continuous tone process is conducted by a dither method, a diffusion method, or a like, a gradation (8 bits) of the image data is converted into another gradation (for example, 2 bits) corresponding to a printer.

As illustrated in FIG. 1, there is a problem in that a gradation number of the output image is substantially deteriorated, if an information amount for depicting a gradation of an output image is lower than an information amount (8 bits) for depicting a gradation of an input image in a color conversion.

FIG. 2 is a diagram for explaining deterioration of the gradation number in the color conversion. FIG. 2 illustrates that input values (input image) are converted into output values (output image) by a color conversion using an LUT (Look Up Table) 510. In FIG. 2, a value of K (black) is "32" in an output value (lattice point value) with respect to an input value (lattice point) (0, 0, 0). Also, the value of K (black) is "28" in the output value with respect to an input value (0, 0, 16). Output values with respect to input values among lattice points are interpolated by conducting an interpolation calculation process such as a cubic interpolation, a triangular prism interpolation, a tetrahedron interpolation, or a like. Calculation results for K (black) by using the interpolation calculation process are exemplified as interpolation values in FIG. 2. However, if the information amount for depicting the gradation of the output value is the same as that of the input value, a difference with a value less than one (after the decimal point) can not be expressed. Accordingly, values defined as actual output values in FIG. 2 are applied as output values. As a result, 16 levels (0 through 16) of the gradation in the input values are reduced to 4 levels (32 through 28) of the gradation in the output values. As described above, if the information amount for depicting the gradation of the output image is fewer than the information amount of the input image, a resolution of an output side becomes lower than a lattice point interval, and the gradation number is substantially degraded.

Moreover, since a γ-correction parameter is generally curvilinear in shape, there is a problem in that when the information amount for depicting the gradation of the output image in the density correction of the γ-correction or a like is less than the information amount (8 bits in this example) for depicting the gradation of the input image, the gradation number of the output image is substantially degraded.

FIG. 3 is a diagram for explaining deterioration of the gradation number in the density correction. In FIG. 3, a table 520 shows input values and logical values. Also, the table 530 shows actual output values. As shown in table 530, if the information amount for depicting the gradation of the output image is less than the information amount for depicting the input image, it is not possible to depict a variance in values less than one in an ideal output value. As a result, the gradation number of the output value is deteriorated.

The deterioration of the gradation number described above causes discontinuity in a gradation image and causes a degraded image which is sufficiently recognizable by human eyes.

SUMMARY OF THE INVENTION

The present invention solves or reduces one or more of the above problems.

In an aspect of this disclosure, there is provided an image processing apparatus, comprising a color conversion part configured to conduct a color conversion of image data, wherein the color conversion part extends an information amount of an output value in the color conversion based on a first minimum information amount possible to depict a gradation in a lattice point interval of an input value in a look up table used for the color conversion.

In the image processing apparatus, it is possible to properly suppress a consumption amount of a resource used to prevent deterioration of an image quality in an image process.

BRIEF DESCRIPTION OF THE DRAWINGS

In the following, embodiments of the present invention will be described with reference to the accompanying drawings.

FIG. 1 is a block diagram illustrating an example of image processes conducted by a printer driver, a controller of a printer, or a like;

FIG. 8 is a diagram illustrating a configuration example of a color conversion table;

FIG. 11 is a diagram illustrating a configuration example of a γ-correction table.

DESCRIPTION OF THE PREFERRED EMBODIMENT

Figure 1:
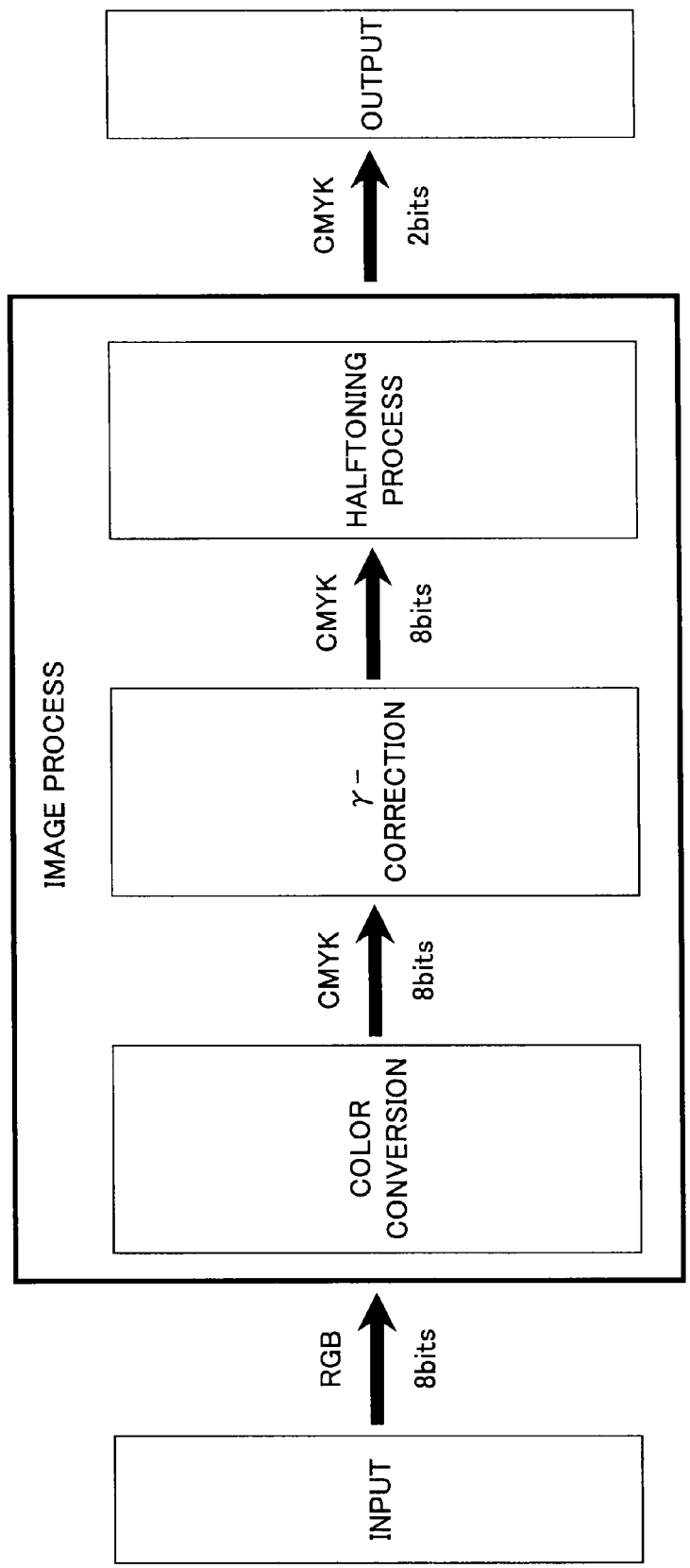
Figure 2:
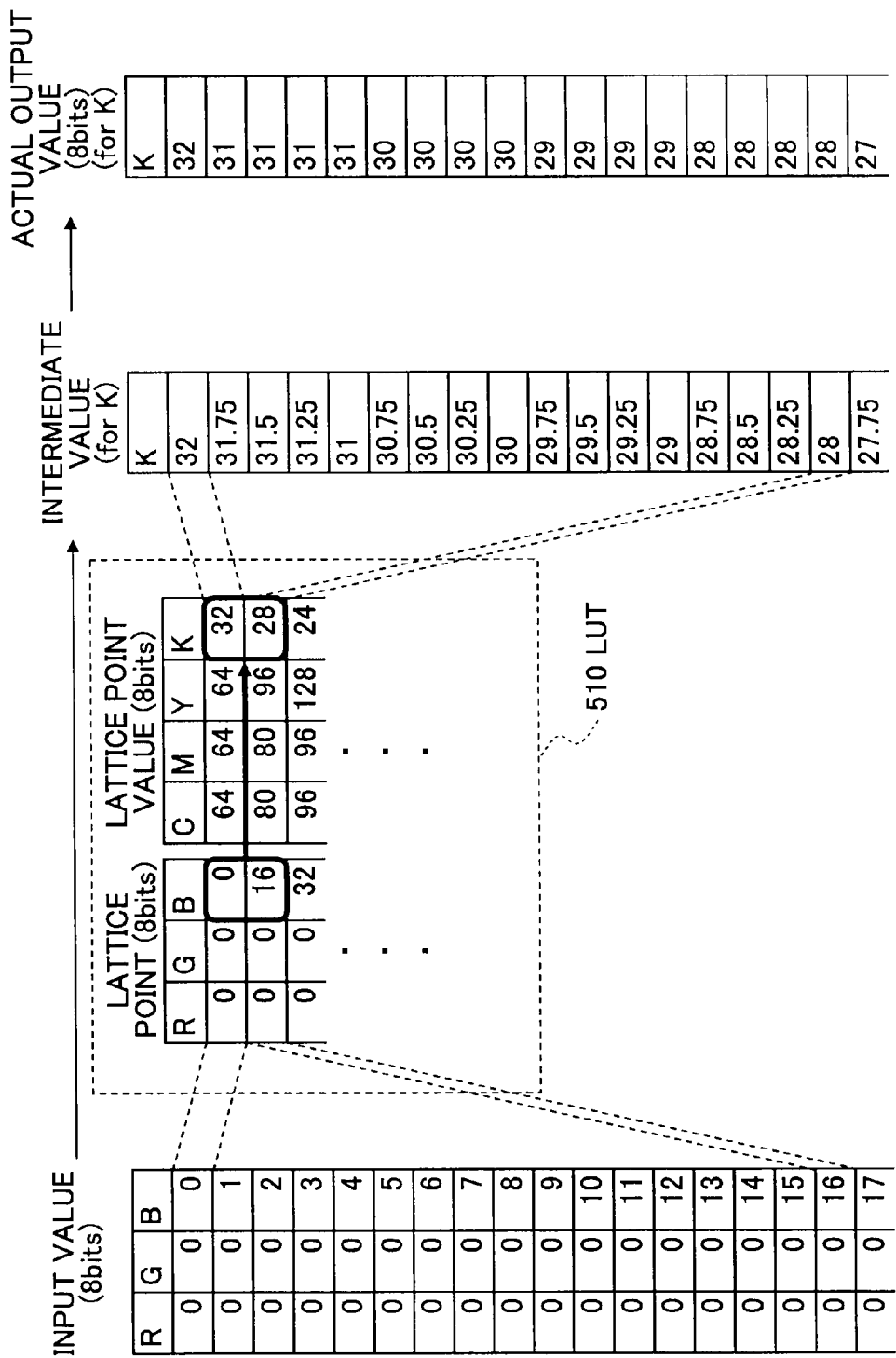
FIG. 2 is a diagram for explaining deterioration of a gradation number in a color conversion.
Figure 3:
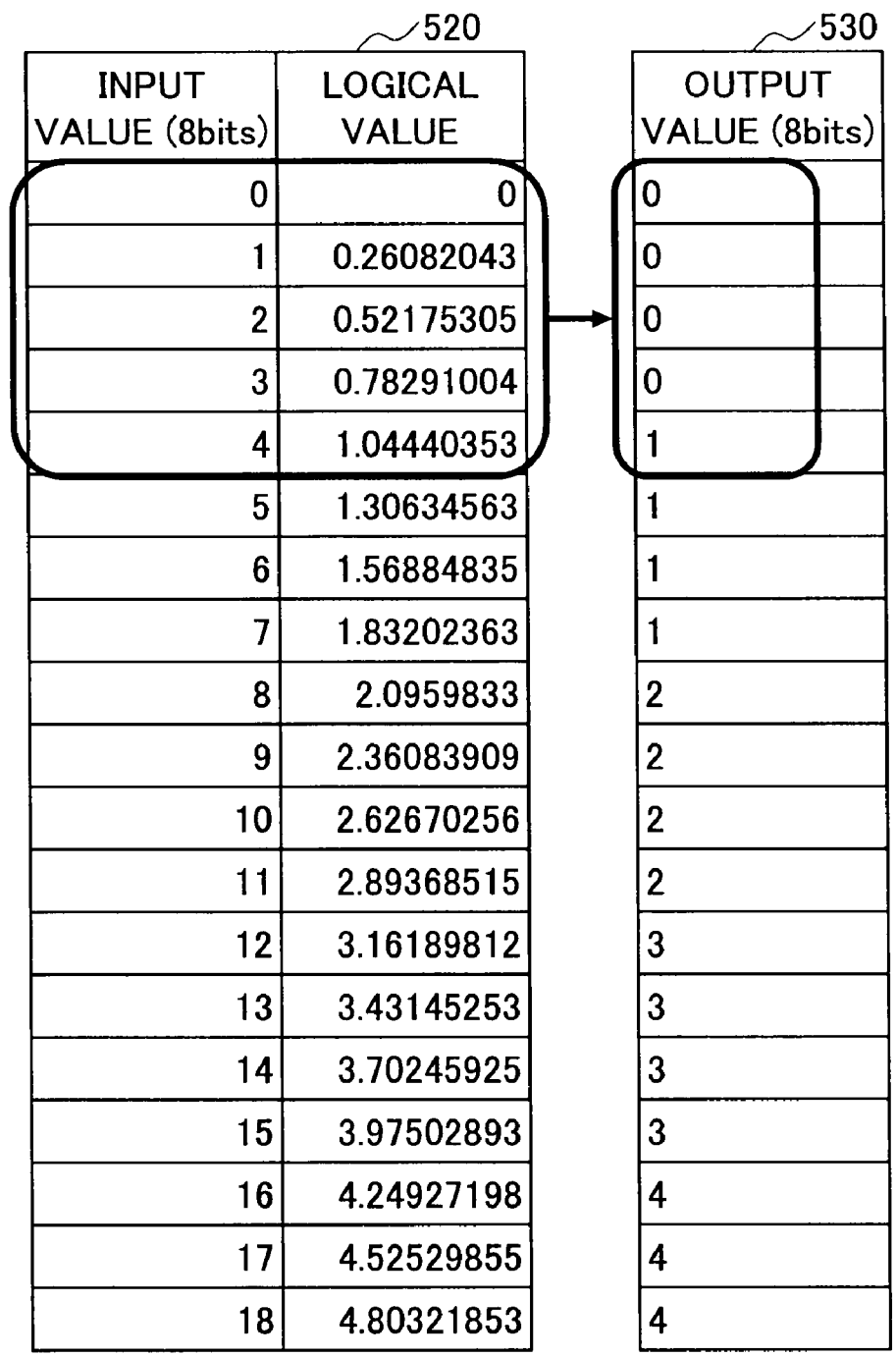
FIG. 3 is a diagram for explaining deterioration of a gradation number in a density correction.
Figure 4:
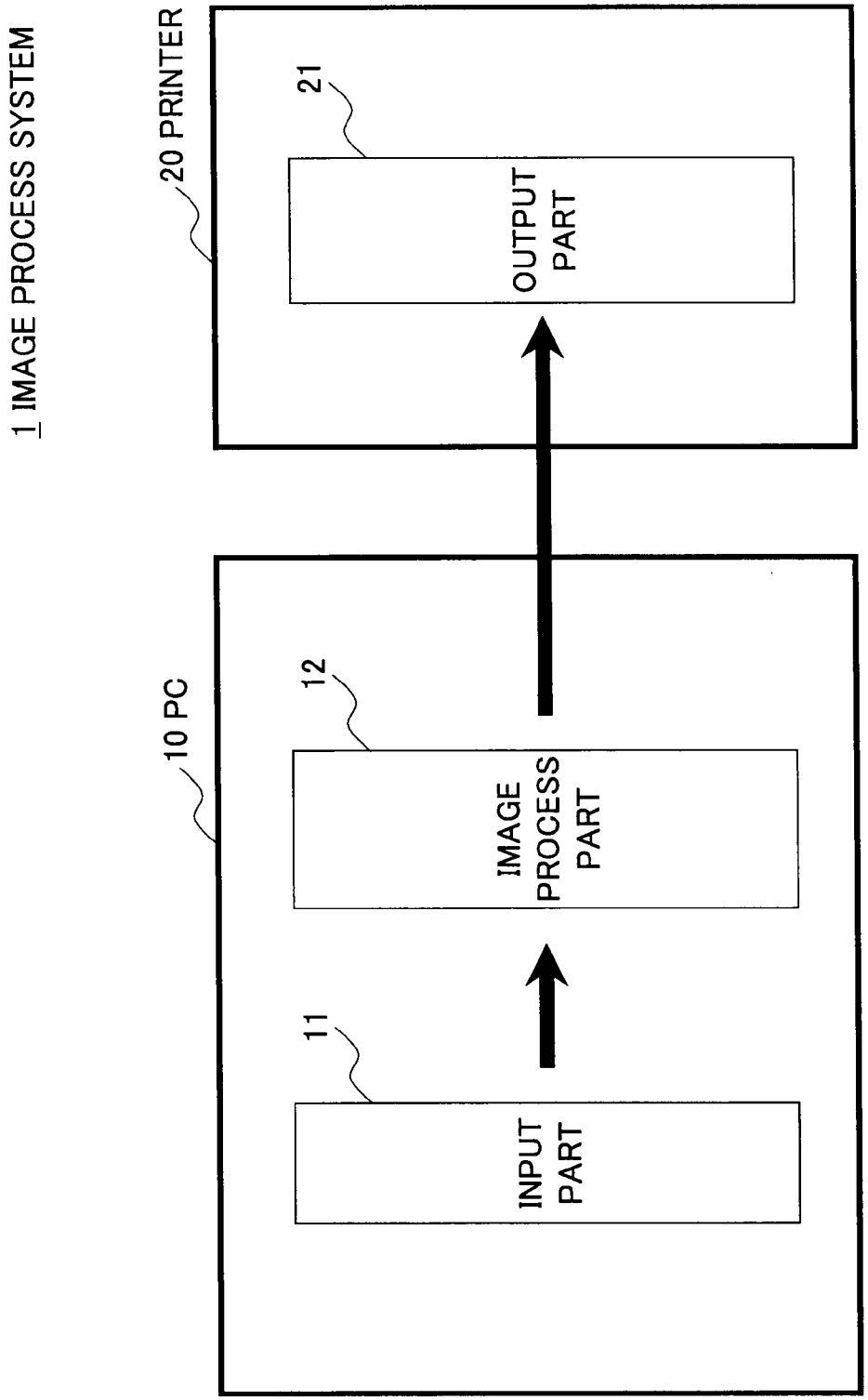
FIG. 4 is a block diagram illustrating a configuration example of an image process system according to an embodiment of the present invention

In the following, an embodiment of the present invention will be described with reference to the accompanying drawings. FIG. 4 is a block diagram illustrating a configuration example of an image process system according to the embodiment of the present invention. In FIG. 4, an image process system 1 includes a PC (Personal Computer) 10 and a printer 20 which are connected through a network.

The PC 10 includes an input part 11, an image process part 12, and a like. The input part 11 inputs image data subject to be printed, to the image process part 12. The image process part 12 conducts an image process for converting image data to be input into image data suitable for the printer 20 to print out. That is, in FIG. 4, the PC 10 corresponds to an image processing apparatus. The image process part 12 is generally embedded in software which is called a printer driver.

The printer 20 includes an output part 21. The output part 21 receives image data to which an image process is conducted by the image process part 12 of the PC 10, and controls a process which makes the printer 20 print out the image data.

Figure 5:
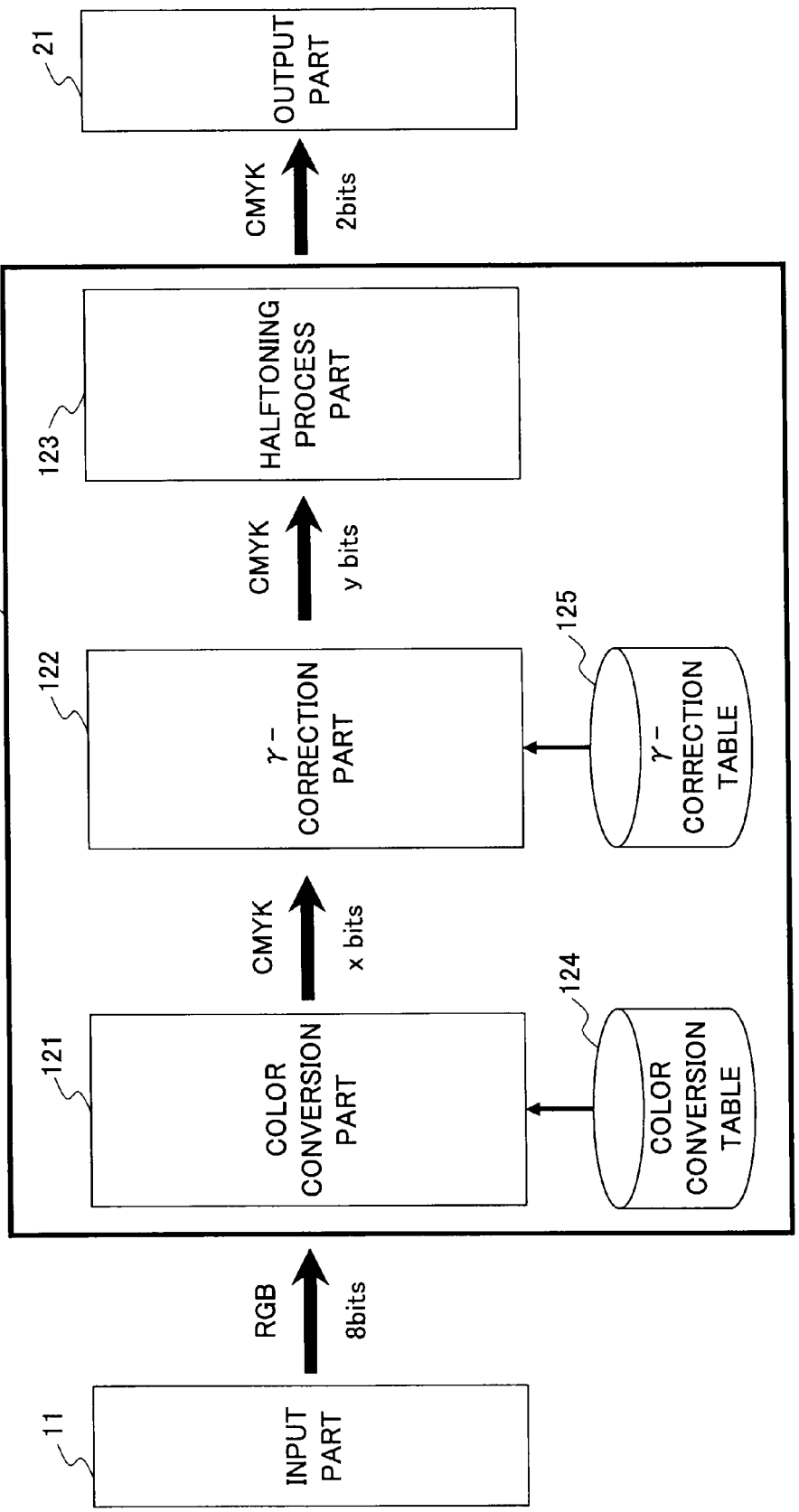
FIG. 5 is a block diagram illustrating a functional configuration example of an image process part.

The image process part 12 of the PC 10 will be described in detail. FIG. 5 is a block diagram illustrating a functional configuration example of the image process part 12. In FIG. 5, the image process part 12 includes a color conversion part 121, a γ-correction part 122, a halftoning process part 123, a color conversion table 124, a γ-correction table 125, and a like.

The color conversion part 121 converts a color space of the image data to be input into the CMYK used for an ink color. The color conversion part 121 appropriately changes (increases) the information amount for depicting gradation of output image data, with respect to the information amount for depicting gradation of the image data to be input when conducting the color conversion. In FIG. 5, image data in which the information amount of the gradation is 8 bits are input to the color conversion part 121, and image data in which the information amount of the gradation is extended to x bits are output. The color conversion part 121 prevents deterioration of a gradation number substantial for an output image in which the color conversion is conducted, by increasing the information amount of the gradation of the output image.

The γ-correction part 122 conducts the density correction (γ-correction) with respect to the image data in which the color conversion is conducted by the color conversion part 121. The γ-correction part 122 approximately changes (increases) the information amount of the gradation of the output image with respect to the information amount for depicting the gradation of the image data to be input, when conducting the density correction. In FIG. 5, image data in which the information of the gradation is x bits is input to the γ-correction part 122, image data in which the information amount of the gradation is extended to y bits. The γ-correction part 122 prevents deterioration of the gradation number substantial to the output image, which is caused by the density correction, by increasing the information amount of the gradation of the output image.

The halftoning process part 123 conducts a pseudo-continuous tone process by a dither method, a diffusion method, or a like, and converts the gradation number of the image data into another gradation number (for example, 2 bits) corresponding to the printer 20.

The color conversion table 124 is an LUT (Look Up Table) used for the color conversion performed by the color conversion part 121. The γ-correction table 125 is another LUT (Look Up Table) used for the density correction performed by the γ-correction part 122.

Figure 6:
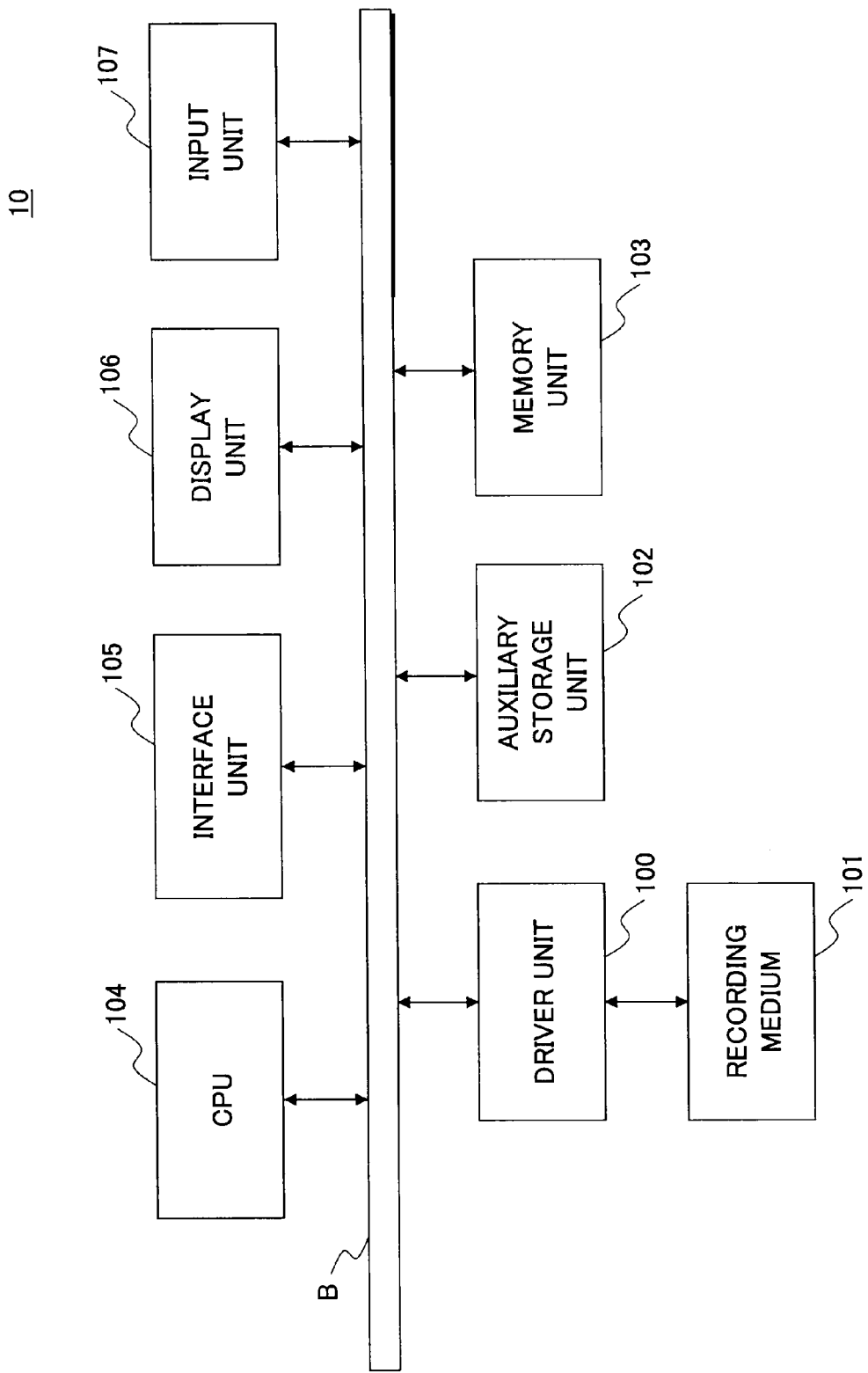
FIG. 6 is a diagram illustrating a hardware configuration example of a PC according to the embodiment of the present invention.

FIG. 6 is a diagram illustrating a hardware configuration example of the PC 10 according to the embodiment of the present invention. The PC 10 in FIG. 6 includes a driver unit 100, an auxiliary storage unit 102, a memory unit 103, a CPU (Central Processing Unit) 104, an interface unit 105, a display unit 106, and an input unit 107, which are mutually connected through a bus B.

A program realizing processes of the PC 10 is provided by a recording medium 101 such as a CD-ROM (Compact Disk Read Only Memory). When the recording medium 101 recording the program is set to the driver unit 100, the program is installed to the auxiliary storage unit 102 from the recording medium 101 to the driver unit 100. The auxiliary storage unit 102 stores the installed program, and also stores necessary files, data, and a like. For example, the color conversion table 124 and the γ-correction table 125 are stored in the auxiliary storage unit 102.

When an instruction is made to execute the program, the memory unit 103 reads out the program from the auxiliary storage unit 102. The CPU 104 realizes functions concerning the PC 10 in accordance with the program stored in the memory unit 103. The interface unit 105 is used as an interface to connect to the network. The display unit 106 displays a GUI (Graphical User Interface) created by the program. The input unit 107 includes a keyboard, a mouse, and a like, and is used to input various operation instructions.

It is not necessary to always install the program from the recording medium 101. The program may be downloaded from another computer through the network.

Figure 7:
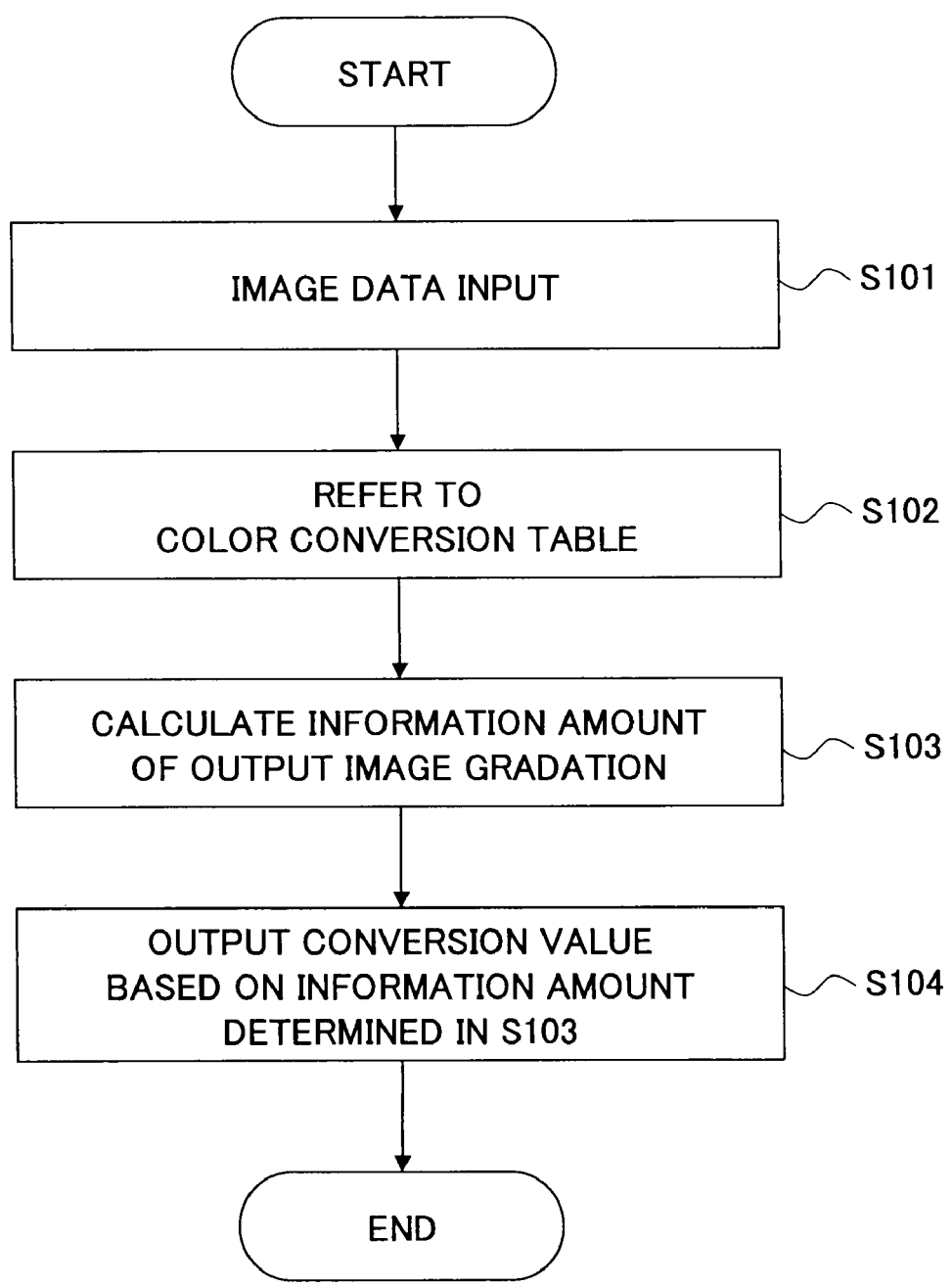
FIG. 7 is a flowchart for explaining process steps conducted by a color conversion part.

In the following, process steps of the image process part 12 will be described. FIG. 7 is a flowchart for explaining the process steps conducted by the color conversion part 121.

The image data input by the input part 11 is accepted (step S101). It is assumed that the image data, in which the information amount for depicting each gradation of RGB (Red, Green, and Black) is 8 bits for each pixel, is input. Subsequently, the color conversion table 124 is referred to (step S102).

FIG. 8 is a diagram illustrating a configuration example of the color conversion table 124. As illustrated in FIG. 8, only a correspondence between RGB values for an input value (a lattice point) and CMYK values for an output value (lattice point value) is registered in the color conversion table 124. In FIG. 8, the input value (0, 0, 0) corresponds to the output value (64, 64, 64, 32), and the input value (0, 0, 16) corresponds to the output value (80, 80, 96, 28). In the color conversion table 124, both the input value and the output value are defined with an information amount (8 bits) as the same as the information amount of the gradation of the input image.

Subsequently, in order to retain the gradation number (input resolution) of the input image in the output image, the information amount (output resolution) for depicting the gradation of the output image is calculated (step S103). In this embodiment, the information amount for depicting the gradation of the output image is calculated by using the following formula (1):

$$n + \lceil \log_2 s \rceil \text{ bit} \quad (1)$$

n: the number of bits of output value in the color conversion table s: lattice point interval, $\lceil \ \rceil$: round up In a case in FIG. 8, n=8 and s=16. Accordingly, the information amount for depicting the gradation of the output image of the color conversion is 12 bits as follows:

$$8+\lceil \log_2 16 \rceil = 8+4 = 12 \text{ bit}$$

The formula (1) is to extend the information amount of the output value in the color conversion table 124 by using a minimum information amount possible to depict the gradation in a lattice point interval of the input value (an interval among the input values) in the color conversion table 124. That is, it is assumed that there is a case in that an interval among the output values is a minimum value (that is, when the interval is "1") with respect to the lattice point interval (an interval among input values). Even in this case of the minimum value, the formula (1) calculates a minimum information amount essential not to deteriorate the gradation number in the output image. In detail, in this embodiment, the information amount of the gradation of the output image is extended to 4 bits with respect to the input image. It is possible to depict 16 levels of the gradation if extending to 4 bits. Accordingly, for the smallest range of the interval of the output values with respect to the lattice point interval, it is possible to depict the gradation with 16 levels. Thus, it is possible to prevent the deterioration of the gradation number in for the entire range. Hereinafter, the information amount extended with respect to the information amount of the gradation of the output value of the color conversion table 124 is called an "extended information amount".

A value calculated by the formula (1) beforehand may be stored as the information amount for depicting the gradation of the output image in the auxiliary storage unit 102. In this case, the color conversion part 121 is not required to calculate based on the formula (1) in the step S103, but may acquire the value stored in the auxiliary storage unit 102.

Subsequently, a conversion value (the output value) of the color conversion is output by using the color conversion table 124 (step S104). In this case, the color conversion part 121 calculates an interpolation value by the interpolation calculation process such as the cubic interpolation, the triangular prism interpolation, or the tetrahedron interpolation for the output value with respect to the input value among lattice points, and calculates a value (output value) by conducting the following calculation with respect to the interpolation value.

$$[IPV \times EGN] \div EGN$$

In this calculation, IPV denotes the interpolation value, EGN denotes the gradation number which can be depicted with the extended information amount, and [ ] denotes rounding down a decimal point. In this case, since the extended information amount is 4 bits, the gradation number possible to depict with the extended information amount becomes 16 levels. By applying the above-described calculation, it is possible to acquire the output image retaining the gradation number of the input image.

Figure 9:
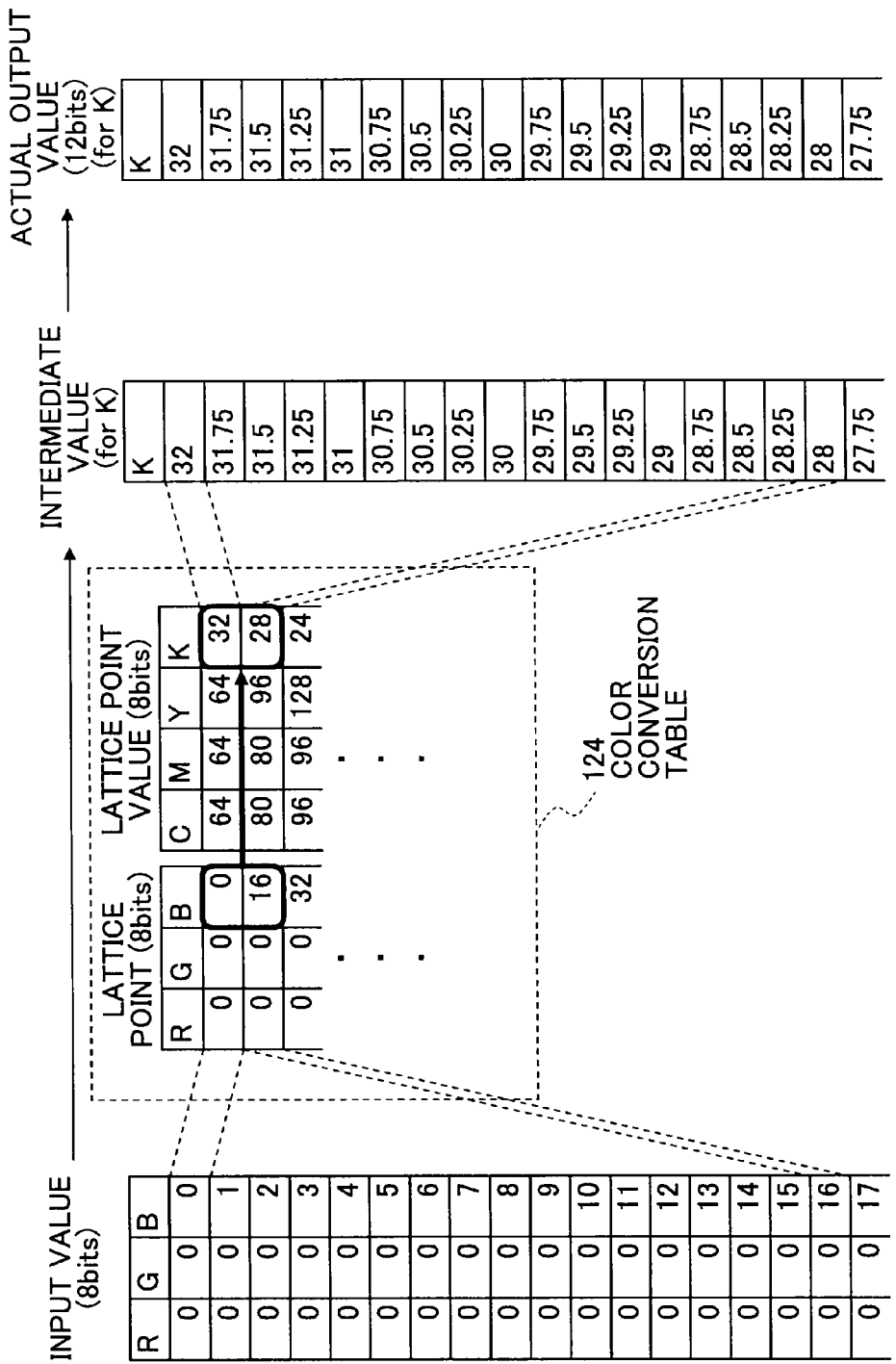
FIG. 9 is a diagram illustrating an example of an output value in a case of extending an information amount of a gradation of the output image.

FIG. 9 is a diagram illustrating an example of the output value in a case of extending the information amount of the gradation of the output image. In FIG. 9, illustrates that the interpolation values and the output values for a range of the input values (0, 0, 0) through (0, 0, 15). For the sake of convenience, only values for K (black) are exemplified for the interpolation values and the output values. As depicted in FIG. 9, the information amount for depicting the gradation of the output value is extended to 12 bits. Accordingly, for a range in which only 4 levels are acquired in conventional technologies, it is possible to depict the gradation with 16 levels and prevent the deterioration of the gradation number.

In the foregoing, the color conversion from RGB to CMYK is described. Also, other color conversions can be conducted in the same manner, from RGB to RGB, from RGB to CMY (Cyan, Magenta, and Yellow), from RGB to CMYKR (Cyan, Magenta, Yellow, Black, and Red), or a like.

Figure 10:
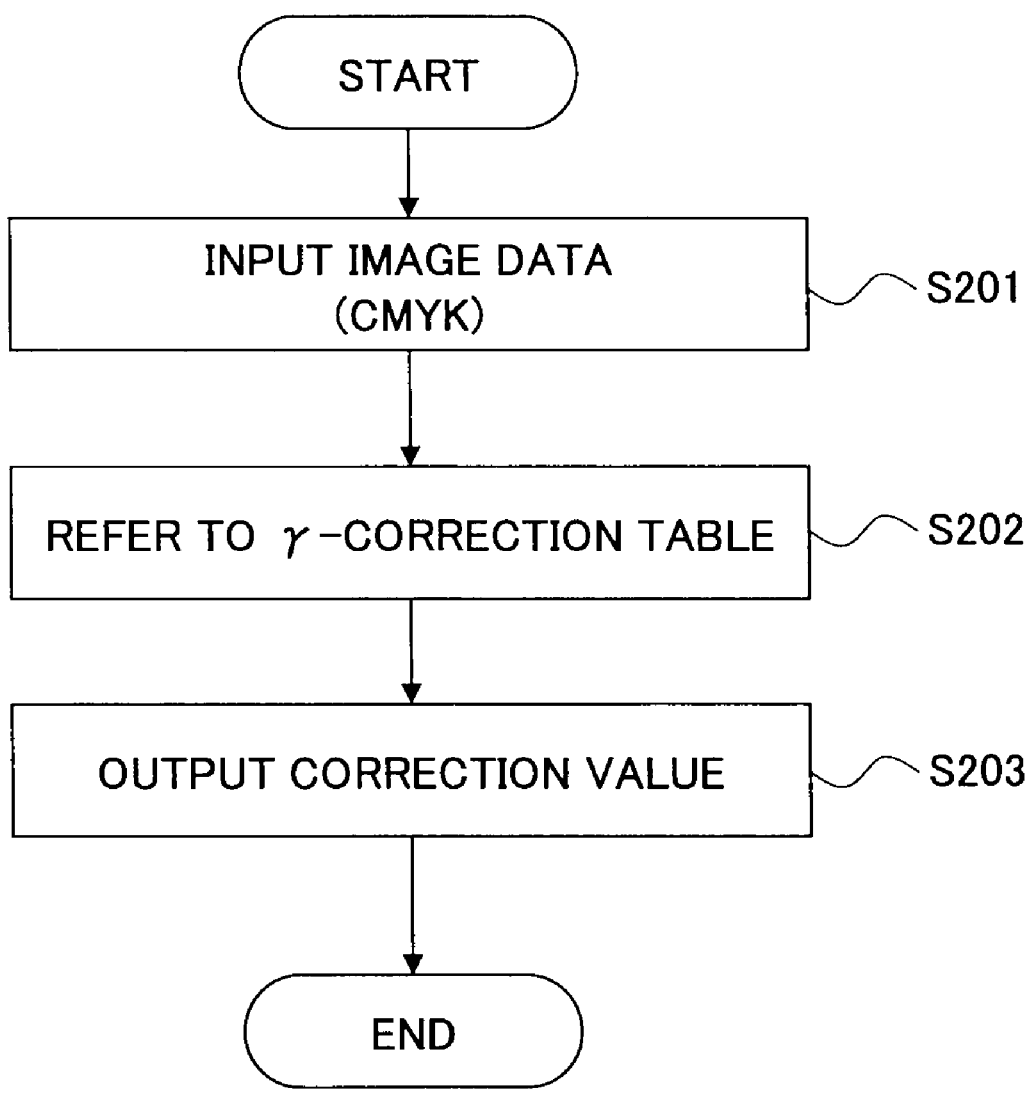
FIG. 10 is a flowchart for explaining process steps conducted by a γ-correction part.

The image data to which the color conversion is conducted are input to the γ-correction part 122. FIG. 10 is a flowchart for explaining process steps conducted by the γ-correction part 122.

The image data to which the color conversion is conducted by the color conversion part 121 are input and accepted (step S201). It is assumed that information amount for depicting each gradation of CMYK (Cyan, Magenta, Yellow, and Black) is 12 bits for each pixel is input. Subsequently, the γ-correction table 125 is referred to (step S202).

FIG. 11 is a diagram illustrating a configuration example of the γ-correction table. As illustrated in FIG. 11, the input value of 12 bits and the output value of 14 bits are registered in the γ-correction table 125 to correspond to each other by one to one. The output value of 12 bits and the logical value do not form the γ-correction table 125 but are exemplified as a reference. The logical value is an output value calculated based on a gamma function. It should be noted that numeral values are 16-fold values.

As illustrated in FIG. 11, the information amount (bit number) of the output value is extended with respect to the input value in the γ-correction table 125 according to the embodiment of the present invention. After extended, the information amount is calculated based on the following formula (2):

$$n + \lceil \log_2 k \rceil \text{ bit} \qquad (2)$$

n: the number of bits of input value
k: reciprocal number of a minimum change rate, ⌈ ⌉: round up In this case, n=12. Also, a reciprocal number k of a minimum change rate of the output value indicates a change amount of the gradation (gradation number) of the input value with respect to a change of one level in the gradation of the output value when the information amount of the input value is the same as the information amount of the output value. In FIG. 11, one level in the gradation of the output value of 12 bits corresponds to 4 levels as the gradation number of the input value. Accordingly, in this embodiment, the information amount for depicting the gradation of the output image of the γ-correction is 14 bits as expressed below.

$$12 + \lceil \log_2 4 \rceil = 12 + 2 = 14 \text{ bit}$$

That is, the formula (2) extends the information amount of the output value with respect to the information amount of the input value by using a second minimum information amount possible to depict a change amount of the gradation of the input value with respect to a change for one level in the gradation of the output value when the information amount of the input value is the same as the information amount of the output value. In detail, in this embodiment, the information amount of the gradation of the output image increases 2 bits more than the input image. It is possible to depict the gradation of 4 levels by using 2 bits. Accordingly, it is possible to depict a change being less than one in the output value during the input value changes four levels. Thus, each output value can be different with respect to all input values. Hereinafter, an additional information amount (2 bits) to the information amount of the input image is called an "extended information amount". It should be noted that the output value with respect to each input value (14 bits) may be acquired based on the following calculation:

$$[LV \times EIA] \div EIA$$

In this calculation, LV denotes the logical value, EIA denotes the gradation number possible to depict the extended information amount, and [ ] denotes rounding down a decimal point. In this case, since the extended information amount is 2 bits, the gradation number possible to depict with the extended information amount becomes 4 levels. By applying the above-described calculation, it is possible to acquire the output image retaining the gradation number of the input image.

Subsequently, the output value with respect to the input value is output based on the γ-correction table 125 created as described above (step S203). Accordingly, 12 bits are extended to 14 bits and are output. As a result, a γ-correction result is output without deteriorating the gradation number of the input image.

Values registered as the input values in the γ-correction table 125 beforehand are not limited to 12 bits but may be 8 bits. It should be noted that the output values are based on the extended information amount (for example, 14 bits). In this case, it is possible to correspond to the input value of 12 bits by extending the value of 8 bits registered in the γ-correction table 125 by using a liner interpolation.

As described above, by the image process part 12 in this embodiment, the information amount of the output value is extended by using the minimum information amount possible to depict the gradation in the lattice point interval of the input value in the color conversion table 124 in the color conversion. Accordingly, the deterioration of the gradation number in the output image can be prevented, and an increase of an excessive consumption amount of a memory can be suppressed.

Moreover, in the density correction, the information amount of the output value is extended based on the minimum information amount possible to depict a change amount of the gradation of the input value with respect to a change of one level in the gradation of the output value when the information amount of the input value is the same as the information amount of the output value. Accordingly, the deterioration of the gradation number (the deterioration of an image quality) in the output image can be prevented, and the increase of the excessive consumption amount of the memory can be suppressed.

This embodiment exemplifies an extension of the information amount of the output value in both the color conversion and the density correction. Alternatively, with respect to either one of the color conversion and the density correction, the information amount of the output value may be extended.

Also, the following formula (3) may be applied, instead of the formula (1).

$$\lceil a \times (n + \log_2 s) \rceil \text{ bit} \quad (3)$$

n: the number of bits of output value in the color conversion table
a: correction coefficient (0.7-1.3)
s: lattice point interval, ⌈ ⌉: round up Also, the following formula (4) may be applied, instead of the formula (2).

$$\lceil a \times (n + \log_2 k) \rceil \text{ bit} \quad (4)$$

n: the number of bits of input value
a: correction coefficient (0.7-1.3)
k: reciprocal number of a minimum change rate, ⌈ ⌉: round up In the formulae (3) and (4), a correction coefficient "a" is multiplied to the formulae (1) and (2), respectively. For example, the correction coefficient "a" may be increased or decreased depending of a reproducible color gamut by combining a print sheet and an ink. In detail, when the correction coefficient a=1.0 is applied in a case of using a regular paper for a inkjet, since a sheet having a narrow color gamut, which is typified by the regular paper such as a PPC (Plain Paper Copier) sheet or a like, decreases a resolution for a necessary gradation, the correction coefficient a is set to be less than 1.0 (for example, 0.8). On the other hand, a sheet having a wider color gamut, which is typified by a glossy paper for a picture, increases the resolution for the necessary gradation, the correction coefficient "a" is set to be greater than 1.0 (for example, 1.2). In each method described above, it is possible to obtain the information amount (bit number) which unnecessarily consumes a resource. Alternatively, the correction coefficient "a" may be increased and decreased based on whether an ink is a pigment or a dye, or which special color such as red, blue, or a like is used.

Figure 12:
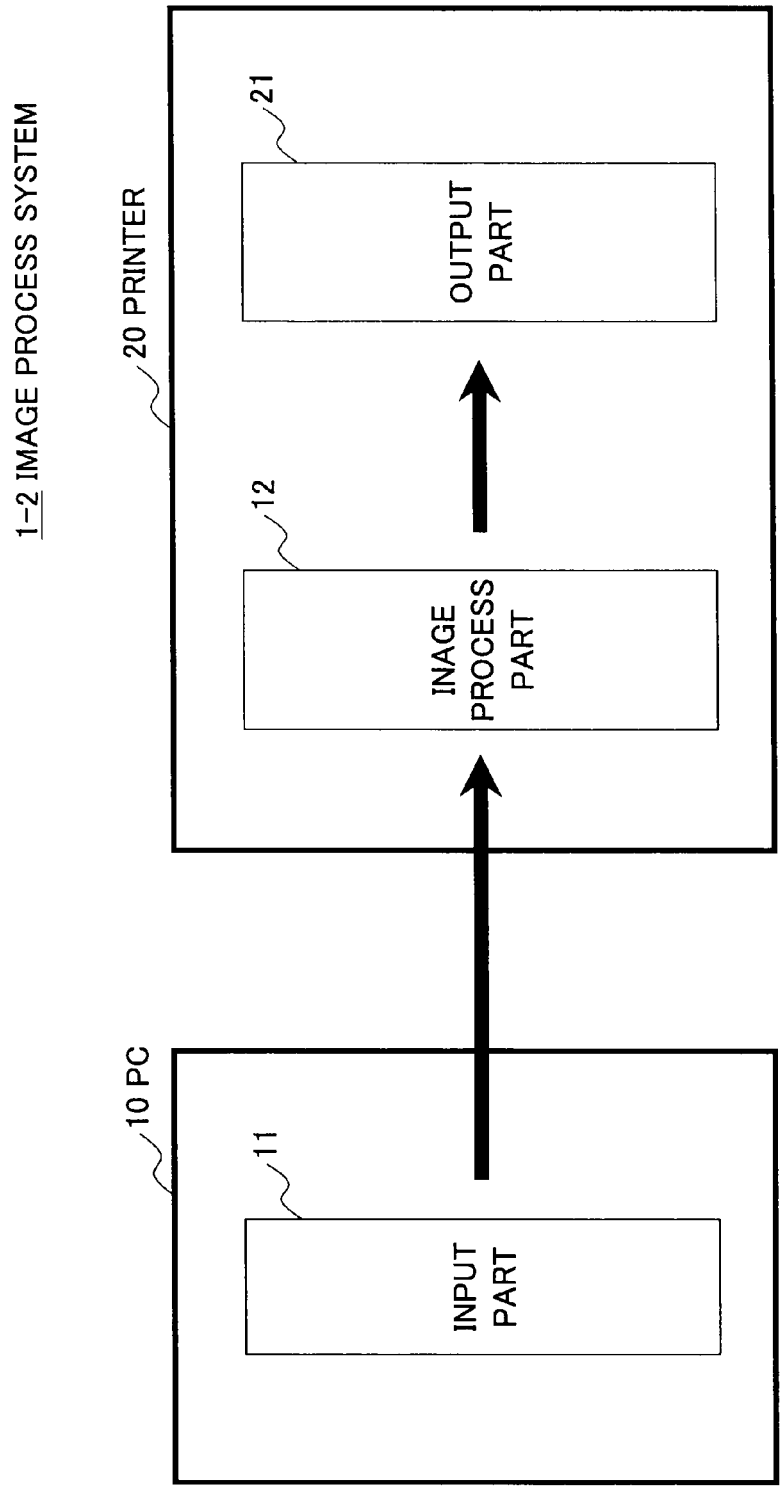
FIG. 12 is a diagram illustrating an example of implementing the image process part in the printer.

Moreover, the image process part 12 in the print system 1 may be implemented in the printer 20. FIG. 12 is a diagram illustrating an example of implementing the image process part 12 in the printer 20. In an image process system 1-2 illustrated in FIG. 12, the image process part 12 is implemented in the printer 20. In this case, the printer 20 corresponds to an image processing apparatus.

According to the present invention, there are provided an image processing apparatus, an image processing method, and a computer-readable encoding medium encoded with a computer program, in which it is possible to suppress an amount of a resource used to prevent the deterioration of the image quality in the image process.

The present invention is not limited to the specifically disclosed embodiments, and variations and modifications may be made without departing from the scope of the invention.

An image processing apparatus according to the present invention may include a density correction part configured to conduct a density correction of image data, wherein the density correction part extends an information amount of an output value in the density correction based on a minimum information amount possible to depict a change amount of a gradation of an input value with respect to a change of one level in a gradation of the output value when an information amount of the input value is the same as the information amount of the output value.

In an image processing method according to the present invention, an image processing apparatus may conduct a density correction of image data, wherein in conducting the density correction, an information amount of an output value in the density correction is extended based on a minimum information amount possible to depict a change amount of a gradation of an input value with respect to a change of one level in a gradation of the output value when an information amount of the input value is the same as the information amount of the output value.

The present invention is not limited to the specifically disclosed embodiments, and variations and modifications may be made without departing from the scope of the invention.

The present application is based on the Japanese Priority Patent Application No. 2007-314705 filed Dec. 5, 2007, the entire contents of which are hereby incorporated by reference.

What is claimed is:
1. An image processing apparatus, comprising a color conversion part configured to conduct a color conversion of image data,
wherein the color conversion part extends an information amount of an output value in the color conversion based on a first minimum information amount possible to depict a gradation in a lattice point interval of an input value in a look up table used for the color conversion.

2. The image processing apparatus as claimed in claim 1, wherein the color conversion part sets an information amount resulted from adding the first minimum information amount to an information amount of the output value in the look up table, as an information amount of an output value in the color conversion.

3. The image processing apparatus as claimed in claim 1, further comprising a density correction part configured to conduct a density correction of the image data to which a color space is converted by the color conversion part,
   wherein the density correction part extends an information amount of an output value in the density correction, based on a second minimum information amount possible to depict a change amount of a gradation of an input value with respect to a change of one level in a gradation of the output value when an information amount of the input value is the same as the information amount of the output value.

4. The image processing apparatus as claimed in claim 3, wherein the density correction part sets an information amount resulted from adding the second minimum information amount to an information amount for depicting a gradation of image data prior to the density correction, as an information amount of an output value in the density correction.

5. An image processing method conducted in an image processing apparatus, comprising conducting a color conversion of image data,
   wherein in conducting the color conversion, an information amount of an output value in the color conversion is extended based on a first minimum information amount possible to depict a gradation in a lattice point interval of the input value in a look up table used for the color conversion.

6. The image processing method as claimed in claim 5, wherein in conducting the color conversion, an information amount resulted from adding the first minimum information amount to an information amount of the output value in the look up table is set as an information amount of an output value in the color conversion.

7. The image processing method as claimed in claim 5, further comprising conducting a density correction of image data in which a color space is converted in conducting the color conversion,
   wherein in conducting the density correction, an information amount of an output value in the density correction is extended based on a second minimum information amount possible to depict a change amount of a gradation of an input value with respect to a change amount of one level in a gradation of the output value when an information amount of the input value is the same as the information amount of the output value.

8. The image processing method as claimed in claim 7, wherein in conducting the density correction, an information amount resulted from adding the second minimum information amount to an information amount for depicting a gradation of image data prior to the density correction is set as an information amount of an output value in the density correction.

9. A non-transitory computer-readable encoding medium encoded with a computer program, said computer program comprising codes for conducting a color conversion of image data,
   wherein in conducting the color conversion, an information amount of an output value in the color conversion is extended based on a first minimum information amount possible to depict a gradation in a lattice point interval of an input value in a look up table used for the color conversion.

* * * * *